(12) United States Patent  
Roth et al.

(10) Patent No.: US 7,478,554 B2  
(45) Date of Patent: Jan. 20, 2009

(54) RIM MOUNTED TIRE PRESSURE MONITORING SYSTEM

(75) Inventors: Stephen Frederick Roth, Port Clinton, OH (US); Richard Nicholas Crano, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/641,333

(22) Filed: Dec. 19, 2006

(65) Prior Publication Data

US 2008/0141766 A1     Jun. 19, 2008

(51) Int. Cl.
*G01M 17/02*     (2006.01)
(52) U.S. Cl. ........................................... 73/146
(58) Field of Classification Search ................ 73/146
See application file for complete search history.

(56) References Cited

U.S. PATENT DOCUMENTS

| | | | | |
|---|---|---|---|---|
| 6,446,005 | B1 * | 9/2002 | Bingeman et al. | 701/215 |
| 6,769,319 | B2 * | 8/2004 | McDonald et al. | 73/866.1 |
| 6,910,372 | B2 * | 6/2005 | Wilson | 73/146.5 |
| 7,076,999 | B1 * | 7/2006 | Knox | 73/146.3 |
| 7,107,830 | B1 * | 9/2006 | Yu et al. | 73/146.4 |
| 2004/0182146 | A1 * | 9/2004 | Wilson | 73/146.2 |
| 2006/0130570 | A1 * | 6/2006 | Anders et al. | 73/146 |
| 2006/0130571 | A1 * | 6/2006 | Thrush et al. | 73/146.2 |

* cited by examiner

*Primary Examiner*—Andre J Allen  
(74) *Attorney, Agent, or Firm*—Richard B. O'Planick

(57) ABSTRACT

A tire and wheel rim assembly includes a tire supporting rim having an outward facing mounting surface and at least one tire body mounted to the rim and positioning an internal tire cavity over the rim mounting surface. A tire pressure monitoring module assembly mounts to the rim mounting surface and includes a housing having an internal pressure chamber; a pressure sensing device and/or a temperature measuring sensor within the housing pressure chamber; and an elongate connecting member extending through the housing and the rim mounting surface. The connecting member has an axial through-passageway communicating with the internal tire cavity and the housing pressure chamber. The connecting member may be configured as an externally threaded bolt having an axial through-passageway. The bolt is in threaded engagement with a threaded opening in the housing and extends through the rim outside mounting surface to couple the housing to the rim. The inflation pressure in the tire cavity is transferred through the axial passageway of the threaded bolt to the pressure chamber within the module housing. The tire pressure monitoring module assembly, attached to the rim outward mounting surface, is positioned in a non-contacting relationship with the one or more tire bodies mounted to side of the rim opposite the rim mounting surface.

8 Claims, 5 Drawing Sheets

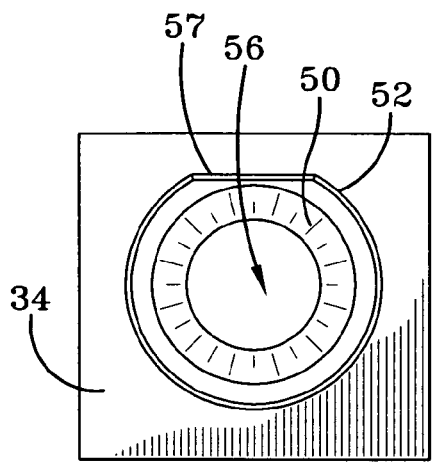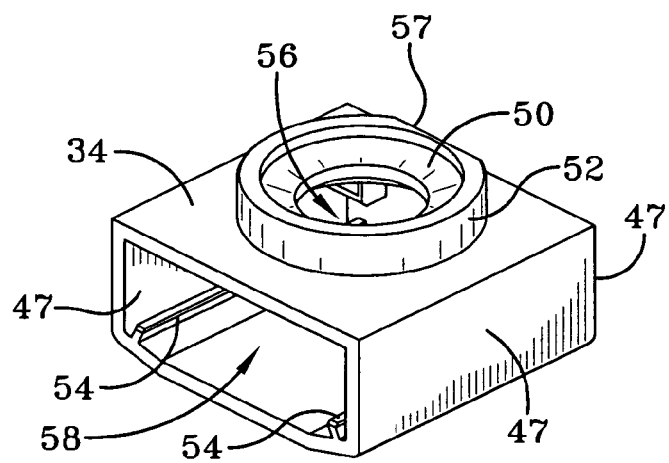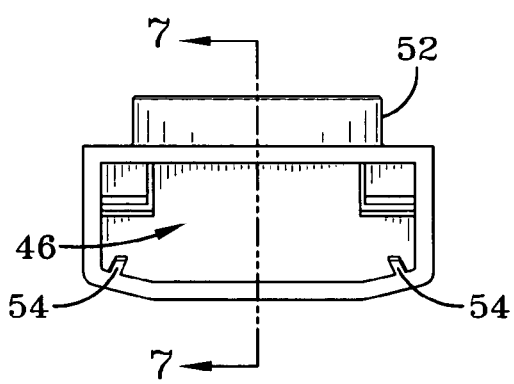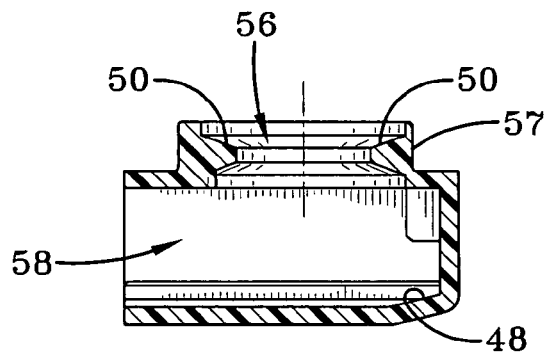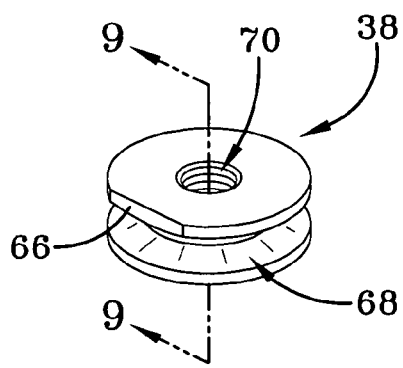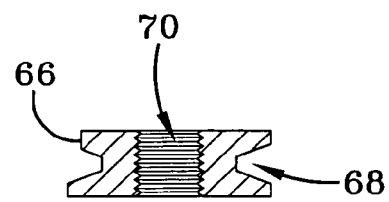

RIM MOUNTED TIRE PRESSURE MONITORING SYSTEM

FIELD OF THE INVENTION

The invention relates generally to tire pressure monitoring systems and, more specifically, to housing assemblies for such systems.

BACKGROUND OF THE INVENTION

Typical commercially available tire pressure monitoring system units are mounted to the inside of a tire in a position from which the air pressure within the tire cavity may be measured. Data representing pressure within the tire is then communicated by a transmitted signal to a reader external to the tire. For example, certain available units integrate a pressure sensing module with the valve stem of a tire. Electronics within the sensor unit measure the air pressure at the valve stem and transmit an appropriate signal to an external receiver. The receiver may be located proximally located to the sensor unit or in a remote location such as the passenger compartment.

While working well, such systems are not useful in meeting the industry's needs in certain applications. For example, in some applications such as in NASCAR race tires, there is a need for a tire pressure-measuring device that may be used conveniently in a two tire system by officials to check start inflation pressure. Such a system should functionally measure inflation pressure without requiring an official to touch the tire. A suitable pressure measuring system will give a positive indication of specific tire read and, for competition reasons, preclude one team from reading another team's tire information. In addition, the pressure measuring system and device must be capable of validation with a mechanical pressure gauge if necessary. In such applications, the tire pressure measuring device should be hardy and capable of surviving multiple races. Ideally, the device will be a standard supported component of the tire/wheel assembly. The operation of the device should further be capable of operational verification before the tire/wheel assemblies are released for control purposes and function without requiring an electromagnetic radiation shield.

An additional hurdle in the development of a suitable pressure measuring device for NASCAR or racing applications is that the tire employed in such applications is typically a dual tire system. The system uses an inner and outer tire, both seated at respective locations on a common rim. When properly seated the inner tire (which has higher inflation than the outer tire) pushes the beads of both tires against the rim flange. The inner tire has molded grooves to allow the inflation pressure in the outer chamber to reach the area adjacent to the flange between the two beads. The pressure measuring device is intended to measure the outer tire pressure and must be capable of accessing and measuring air pressure within the region between the inner and outer tires in a manner that does not interfere with tire performance or conflict with the accomplishment of the other objectives summarized above.

SUMMARY OF THE INVENTION

Pursuant to one aspect of the invention, a tire and wheel rim assembly includes a tire supporting rim having an outward facing mounting surface and at least one tire body mounted to the rim positioning an internal tire cavity over the rim mounting surface. A tire pressure monitoring module assembly mounts to the rim mounting surface and includes a housing having an internal pressure chamber; a pressure sensing device within the housing pressure chamber; and an elongate connecting member extending through the housing and the rim mounting surface. The connecting member has an axial through-passageway communicating with the internal tire cavity and the housing pressure chamber.

According to another aspect of the invention, the connecting member is an externally threaded bolt having an axial through-passageway. The bolt is in threaded engagement with a threaded opening in the housing and extends through the rim outside mounting surface to couple the housing to the rim. The inflation pressure in the tire cavity is transferred through the axial passageway of the threaded bolt to the pressure chamber within the module housing.

In yet another aspect of the invention, the tire pressure monitoring module assembly is mounted to a side of a rim opposite the tire contacting rim side and is therefore in a non-contacting relationship with one or more tire bodies mounted to the rim.

BRIEF DESCRIPTION OF THE DRAWINGS

The invention will be described by way of example and with reference to the accompanying drawings in which:

FIG. 4 is a perspective view of the TPMM housing.

FIG. 5 is a top plan view of the TPMM housing.

FIG. 6 is a front elevation view of the TPMM housing.

FIG. 7 is a transverse section view through the TPMM housing taken along the line 7-7 of FIG. 6.

FIG. 8 is a top perspective view of the insert body.

FIG. 9 is a transverse section view through the insert body taken along the line 9-9 of FIG. 8.

DETAILED DESCRIPTION OF THE INVENTION

Figure 1:
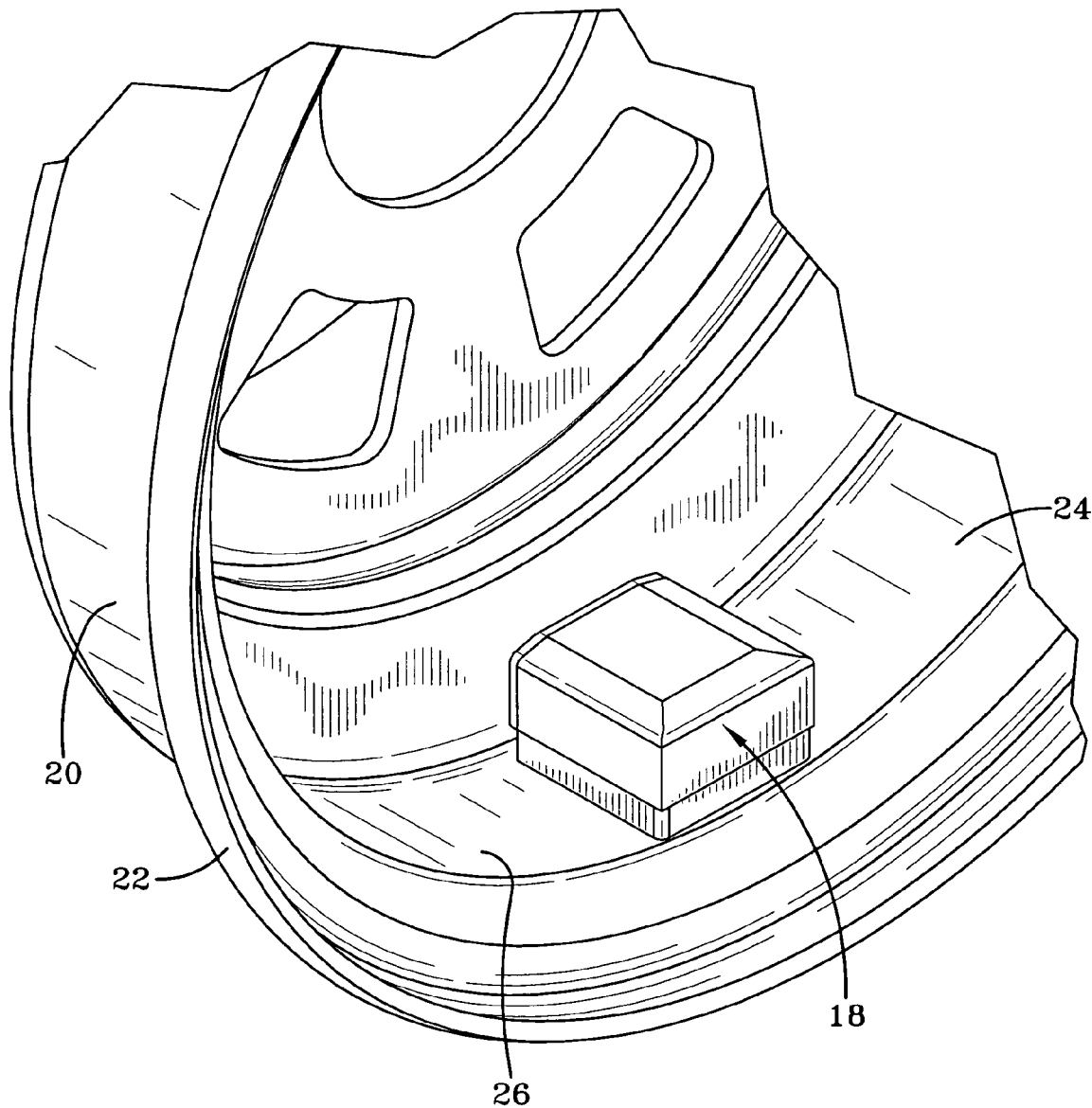
FIG. 1 is a perspective view of a tire rim portion having a tire pressure monitoring module (TPMM) mounted thereto.
Figure 2:
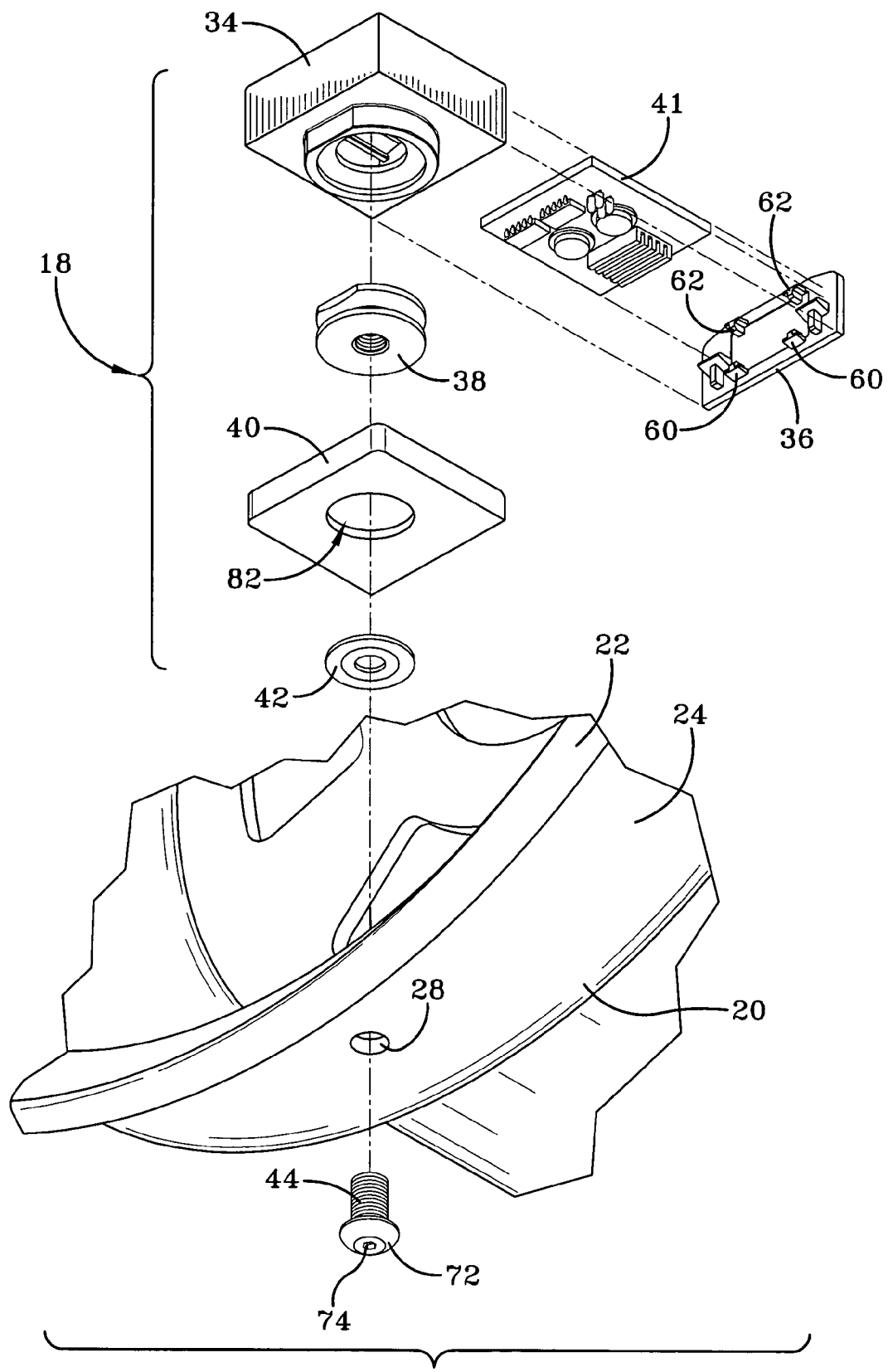
FIG. 2 is an exploded perspective view of a rim portion and tire pressure monitoring module configured pursuant to the invention.
Figure 3:
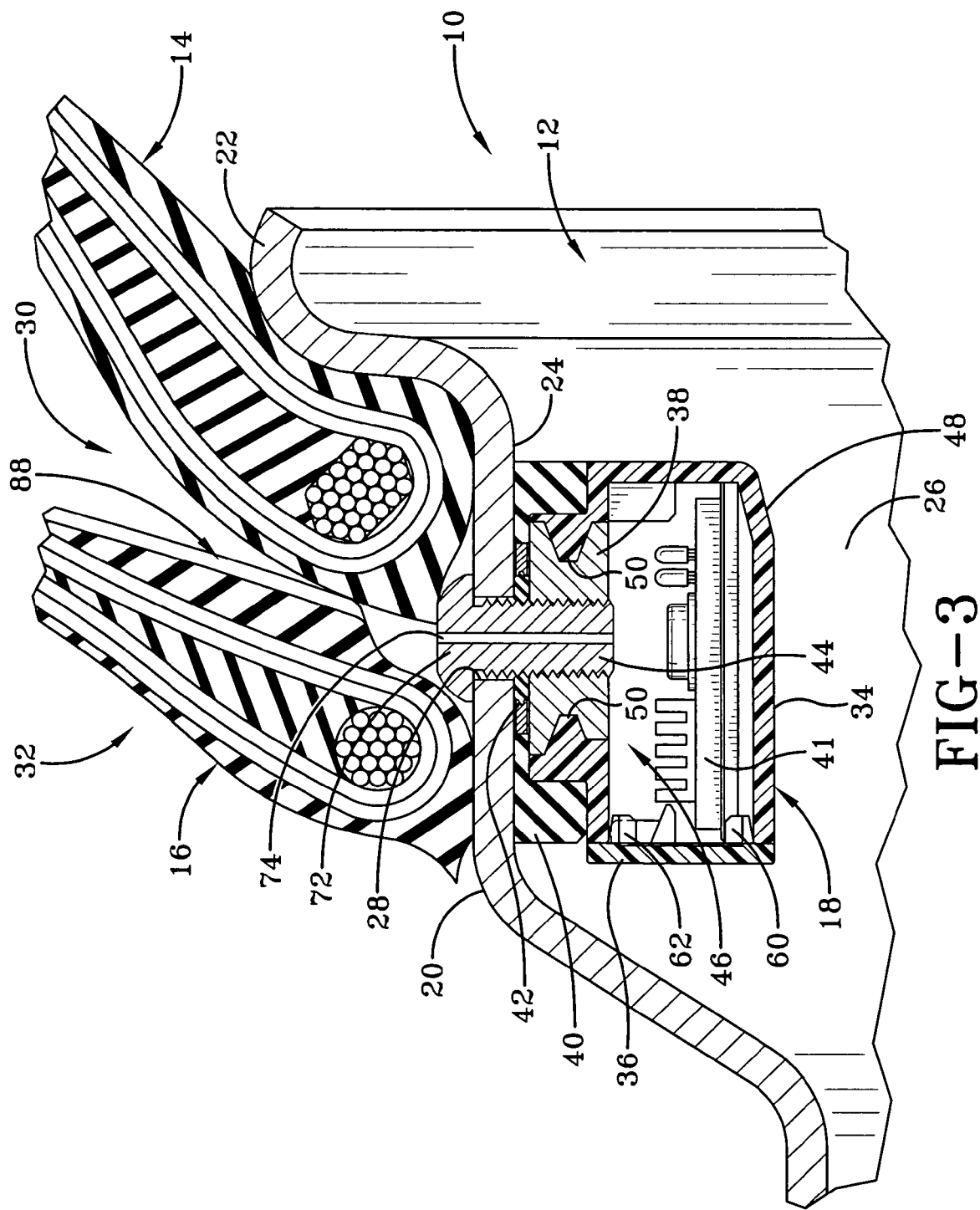
FIG. 3 is a transverse section view through a tire rim portion having a pair of tire bodies mounted thereto, and a tire pressure monitoring module mounted to the rim portion pursuant to the invention.
Figure 11:
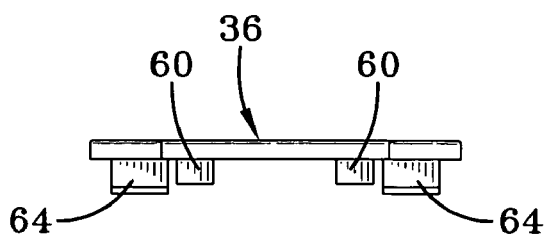
FIG. 11 is a side elevation view of the housing cover.
Figure 10:
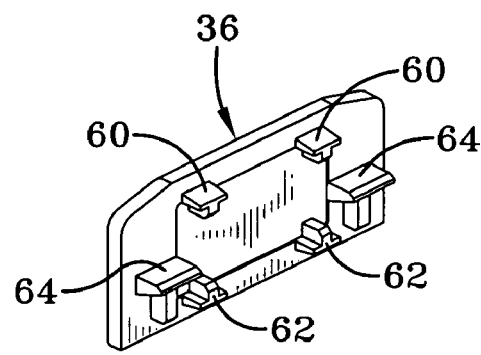
FIG. 10 is a front perspective view of the housing cover.
Figure 12:
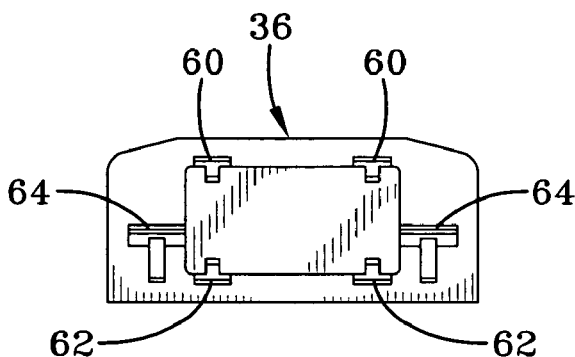
FIG. 12 is a front elevation view of the housing cover.
Figure 13:
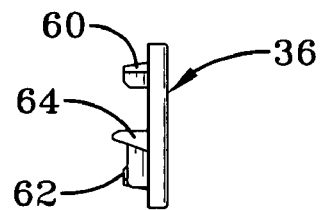
FIG. 13 is an end elevation view of the housing cover.

With reference to FIGS. 1, 2, and 3, a tire, rim, and tire pressure monitoring module assembly 10 is shown. The rim 12 is of a conventional rim configuration. A two tire system, such as that used in NASCAR racing is depicted for the purpose of illustration, it being understood that the subject rim mounted tire pressure monitoring system is capable of utilization in a single tire and rim application. A pair of spaced apart tire bodies 14, 16 of conventional tire configuration are mounted to the rim 12, the tire body 16 representing an inner tire and the tire body 14 representing an outer tire. The inner tire 16 functions to maintain stability in the event the outer tire 14 is damaged or otherwise deflates. In a two tire system such as that shown, both tires are mounted to a common rim internal surface region 20. With the beads of the tire bodies 14, 16 properly seated on surface 20, the inner tire 16 (which has higher inflation pressure than the outer tire) pushes both beads against the rim flange 22. The inner tire 16 is formed to provide molded grooves 88 to allow the inflation pressure in the cavity 30 of the outer tire 14 to reach the area adjacent to the flange between the two beads for tire pressure measurement.

As described above, the air pressure within the tire cavity 32 of the inner tire 16 is maintained higher than the pressure of the outer tire body 14. In order to achieve competitive equality between racing cars and for safety considerations, the air pressure within the tire body 14 is monitored. A tire pressure monitoring module 18 is employed for this purpose. Module 18 is mounted to an outward facing rim surface 24 adjacent a rim well wall 26. As best seen from a collective consideration of FIGS. 1, 2, and 3, the module 18 includes a casing or housing 34, an end cap 36, an insert body 38, a gasket 40, a circuit board 41, a sealing washer 42, and bolt 44.

With reference to FIGS. 4, 5, 6, and 7, the module housing 34 includes an internal pressure chamber 46 enclosed by three sidewalls 47 and end cap 36. An internal shoulder 48 is formed within the chamber 46 opposite an open side 58. A generally circular collar 52 projects from the housing 34 and an annular shoulder 50 projects into a collar passageway 56. The passageway 56 extends through the collar 52 and the annular shoulder 50 into communicating relationship with the chamber 46. A pair of circuit board supporting rail flanges 54 extend along the interior of the housing 34 as shown and a flat surface 57 is formed in a side of the collar defining bore 56. The housing 34 may be formed from any suitable material such moldable thermoplastic or thermoset plastics material having sufficient temperature and strength characteristics for strength and dimensional stability in a tire/wheel rim environment.

As shown in FIGS. 10, 11, 12, and 13, the end cap 36 is a generally rectangular cap formed of suitable material such as the material of housing 34. The end cap is attached securely to the housing 34 by laser welding, ultrasonic welding, adhesive or other suitable means to enclose the opening 58 and includes a pair of integrally molded projecting protrusions 60 and a pair of protrusions 62. Protrusions 60, 62 locate the end cap 36 into the housing opening. The end cap 36 further has spaced apart pair of T-shaped protrusions 64. The circuit board 41 is inserted through the opening 58 and positioned on the support rail flanges 54. The board may then be slid into the chamber 46 of housing 34 until abutment. Thereafter, the end cap 36 is securely attached by appropriate means to the housing 34 over the opening 58. Secure attachment of end cap 36 to the housing 34 creates an airtight seal between the end cap and the housing such that air within the chamber 46 cannot escape. Protrusions 64 engage the circuit board 41 within the chamber 46 to fix the board 41 in place and deter movement of the board within the housing 34.

As will be appreciated from FIGS. 8 and 9, the insert body 38 is dimensioned and configured to seat within the housing opening 56 and includes a flat surface 66 that registers opposite the flat surface 57 of the housing collar 52. So positioned, the insert body 38 is constrained from rotating within the housing collar 52. The annular shoulder 50 of the collar 52 is positioned within an annular groove 68 in the insert body 38 and acts to locate and secure the insert body within the collar 52. The insert body 38 is formed having a threaded through bore 70. The body 38 may be formed of any suitable material having requisite strength. The insert body 38 is preferably although not necessary formed of stainless steel having internal threads to accept the mounting bolt 44. The bolt 44 is likewise preferably formed of metal. Washer 42 is preferably formed of a composite material. The metal to metal contact between the insert body 38, the washer 42, the bolt 44 and the rim 12 eliminates compression stress on the plastic housing 34.

The mounting bolt 44 is externally threaded and includes a bolt head 72 and an axial through bore 74. The bolt may be approximately ¼ inches in length with a 0.080 inch diameter through bore 74.

Figure 14:
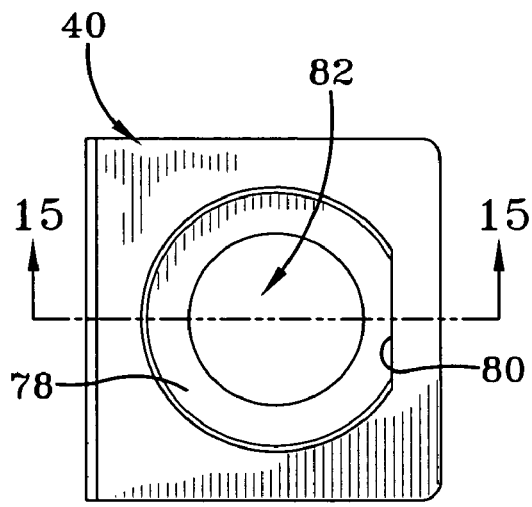
FIG. 14 is a plan view of the gasket component of the TPMM.
Figure 16:
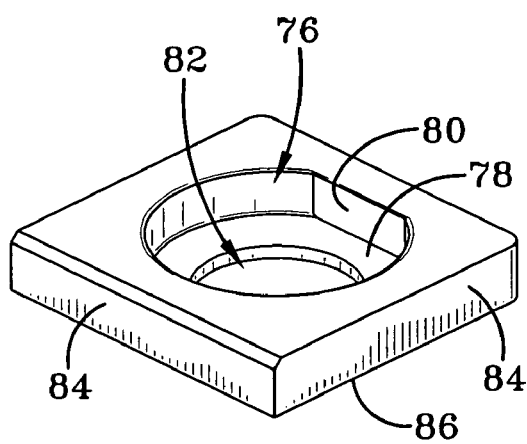
FIG. 16 is a front perspective view of the gasket.
Figure 15:
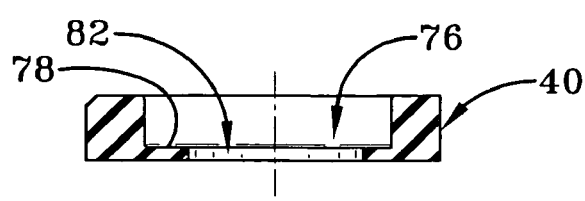
FIG. 15 is a sectional view through the gasket taken along the line 15-15 of FIG. 14.

FIGS. 14, 15, and 16 illustrate the gasket 40 in detail. The gasket 40 includes sidewalls 84 and having a wall 86. A larger dimensioned chamber 76 of circular cross-sectional configuration extends into the gasket wall 86 to an annular flange 78. A flat surface 80 defines a side of the chamber 76 within the gasket. An opening 82 of reduced diameter extends from the annular flange 78 to an opposite side of the gasket. The gasket is formed of a high temperature material such as a fluoro-elastomeric material. The washer 42 may likewise be formed of a high temperature material such as a composite metal and elastomeric material.

The transponder board 41 may include temperature and pressure measuring devices common to the industry. In addition, the board 41 may include ID data storage and calibration constraints. Operation of the board 41 is to monitor and measure temperature and/or pressure within the tire 14 and communicate a signal representing measured values to an external reader (not shown). Devices suitable for use for such a purpose are common and commercially available.

The tire pressure monitoring module 18 is mounted to the rim 12 as will be apparent from FIGS. 1, 2, and 3. The circuit board 41 is sealed within the pressure chamber of the housing 34 by the end cap 36. The hole 28 is drilled through the rim surface 20 and the bolt 44 extends therethrough. The washer 42 receives the bolt shaft therethrough and abuts against surface 24 of the rim to prevent air from leaking from around the bolt. The housing collar portion 52 receives the insert body 38 therein with the annular flange 50 of the housing 34 entering into the annular groove 68 of the insert body. The gasket 40 is positioned over the housing 34 and receives the collar portion 52 of the housing 34 into the gasket opening 76. Flat surface 57 of the collar 52 registers opposite the flat surface 80 of the gasket 40 to prevent relative rotation from occurring between the gasket and the housing. The washer 42 is inserted into and seats within the gasket opening 82.

The threaded shaft of bolt 44 extends through the washer 42 and the gasket 40 and threads into the insert body threaded bore 70. The tire pressure module 18 is thus firmly affixed to the rim surface 24 and against the rim surface 26. In the attached and mounted position, the bore 74 through the bolt 44 is in direct communication with the internal pressure chamber 46 of the housing 34 and the electronics on circuit board 41 for measuring temperature/pressure. The inflation pressure in the tire cavity 30 of the tire body 14 is transferred through the bore 74 of the bolt 44 to the pressure chamber in the module. The enclosed electronics within the chamber 46 sense the pressure and transmit an appropriate signal to an external reader.

As seen from FIG. 3, the subject tire pressure monitoring module 18 mounts directly to outer surface 24 of rim 12. The module is thus accessible for replacement or repair should the need arise. Moreover, the bolt head 72 is in direct contact with the tire cavity 30. The sensor module is mounted on the opposite side of the rim as the tires and does not contact either tire 14, 16. The pressure monitoring module 18 is accordingly in a non-contacting relationship with the tire(s) mounted to the rim 12. Accuracy of the module 18 in measuring air pressure within the tire(s) is accordingly not dependent on maintaining a secure mechanical coupling between the tire and the pressure sensor as is the case with state of the art systems such as valve stem mounted pressure monitoring systems. In racing applications, a plurality of grooves 88 are formed within the inner tire 16 and function to allow the air within the cavity 30 of tire 14 to have direct access to the bolt head 72.

From the foregoing, it will be readily apparent that the subject system that mounts the pressure monitoring module 18 directly to the rim 12 achieves significant advantages. Inflation pressure may be measured without touching the tire(s) and a positive indication of specific tire pressure in the outer tire may be accurately read. The data transmission protocol within each module 18 may be designed to prevent one racing team from reading another team's tire/rim/module systems. Since the valve stem of the tires is not engaged by the subject invention module 18, a mechanical pressure gauge may be used on the valve stem if desired to validate the measurement of the module 18. Such a redundancy and cross-verification can insure that a correct determination of the tire pressure is made. The module 18 mounts on an outer surface of the rim 12 and is thus protected and can survive multiple races in contrast with tire mounted devices that must endure the forces imposed on the devices by the tire. The module 18 may be incorporated as a standard component of a tire/wheel assembly and the operation of the module may be verified before the tire/wheel assembly is released from production. The electronics within the module 18 may further work with or without electro-magnetic transmission shields. While only one sensor module 18 is shown attached to the rim, multiple modules 18 may be deployed if desired monitoring the same or differing cavities within the tire components.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire and wheel rim assembly comprising:
   a tire supporting rim having an outward facing module assembly mounting surface on an outward facing rim side;
   at least one tire body mounted to the rim positioning an internal tire cavity over an internal rim side in alignment with the outward facing rim module assembly mounting surface;
   at least one tire pressure monitoring module assembly comprising: a housing mounted to the module assembly mounting surface of the rim and having an internal pressure chamber; a pressure sensing device within the housing pressure chamber; an elongate connecting member extending through the housing and the rim outside mounting surface, the connecting member having an axial through-passageway communicating with the internal tire cavity and the housing pressure chamber; and
   wherein the tire pressure monitoring assembly is in a non-contacting relationship with the tire body.

2. An assembly according to claim 1, wherein the connecting member is a threaded bolt in threaded engagement with a threaded opening in the housing and extending through the rim outside mounting surface, the axial passageway extending through the threaded bolt.

3. An assembly according to claim 2, wherein the inflation pressure in the tire cavity is transferred through the axial passageway of the threaded bolt to the pressure chamber within the module housing.

4. An assembly according to claim 3, wherein an interface between the threaded bolt and the threaded opening in the housing is substantially airtight.

5. An assembly according to claim 1, wherein the pressure sensing device includes means for transmitting a measured pressure value to an external reader device.

6. An assembly according to claim 1, wherein the housing pressure chamber is substantially airtight within the housing.

7. An assembly according to claim 1, wherein the housing is substantially composed of plastics material.

8. An assembly according to claim 1, wherein further comprising an insert body substantially composed of metallic material and positioned within the housing, the connecting member extending through a throughbore within the insert body.

\* \* \* \* \*